(12) United States Patent
Liu et al.

(10) Patent No.: US 11,475,448 B2
(45) Date of Patent: *Oct. 18, 2022

(54) MAINTENANCE PLANT MANAGEMENT METHOD, SYSTEM AND DATA MANAGEMENT SERVER

(71) Applicant: LAUNCH TECH CO., LTD., Guangdong (CN)

(72) Inventors: Jun Liu, Guangdong (CN); Xin Liu, Guangdong (CN); Rijun Xiao, Guangdong (CN)

(73) Assignee: LAUNCH TECH CO., LTD., Guangdong (CN)

( * ) Notice: Subject to any disclaimer, the term of this patent is extended or adjusted under 35 U.S.C. 154(b) by 870 days.

This patent is subject to a terminal disclaimer.

(21) Appl. No.: 16/060,874

(22) PCT Filed: May 30, 2018

(86) PCT No.: PCT/CN2018/089044
§ 371 (c)(1),
(2) Date: Jun. 8, 2018

(87) PCT Pub. No.: WO2019/227345
PCT Pub. Date: Dec. 5, 2019

(65) Prior Publication Data
US 2020/0320530 A1    Oct. 8, 2020

(51) Int. Cl.
*G06Q 20/40* (2012.01)
*G06Q 20/42* (2012.01)
(Continued)

(52) U.S. Cl.
CPC ........... *G06Q 20/401* (2013.01); *G06Q 10/02* (2013.01); *G06Q 10/20* (2013.01);
(Continued)

(58) Field of Classification Search
CPC ...... G06Q 20/401; G06Q 10/02; G06Q 40/06; G06Q 20/0855; G06Q 10/20; G06Q 20/42;
(Continued)

(56) References Cited

U.S. PATENT DOCUMENTS 6,651,778 B1 * 11/2003 Manning ............ F01M 11/0458
                                                     184/1.5
9,558,466 B2 *  1/2017 Ryali ................. G06Q 10/0639
(Continued)

FOREIGN PATENT DOCUMENTS

CN    106960594 A    7/2017
CN    107563846 A    1/2018
(Continued)

OTHER PUBLICATIONS

Anonymous, "Appointment With Deposit—Stew's Self-Service Garage", Jun. 5, 2016, retrieved Feb. 16, 2021 from the Internet, https://web.archive.org/web/20160605012421/http://stewsgarage.com/make-an-appointment-2/, 3 pages. (Year: 2016).*

(Continued)

*Primary Examiner* — Jacob C. Coppola
*Assistant Examiner* — Eduardo Castilho
(74) *Attorney, Agent, or Firm* — Hamre, Schumann, Mueller & Larson, P.C.

(57) ABSTRACT

The present application discloses a maintenance plant management method, maintenance plant management system and data management server, this method comprises: receiving, via a data management server, a transaction request of using a maintenance plant from a first user and calling a usage smart contract to grant a permission of usage of the maintenance plant to the first user according to the transaction request; calling the usage smart contract to send a transaction payment request to the first user according to (Continued)

transaction information when the first user finishes using the maintenance plant; performing a sharing according to the transaction sharing rule via the data management server when the payment transaction is finished by the first user; and receiving the transaction information submitted by the data management server and registering the transaction information in a block chain via the block chain node device.

10 Claims, 6 Drawing Sheets

(51) Int. Cl.
    *H04L 9/40*           (2022.01)
    *G06Q 10/00*         (2012.01)
    *G06Q 20/08*         (2012.01)
    *G06Q 40/06*         (2012.01)
    *G06Q 10/02*         (2012.01)
    *H04L 9/32*           (2006.01)
    *H04L 9/06*           (2006.01)
    *H04L 9/00*           (2022.01)

(52) U.S. Cl.
    CPC ......... *G06Q 20/0855* (2013.01); *G06Q 20/42* (2013.01); *G06Q 40/06* (2013.01); *H04L 9/3239* (2013.01); *H04L 63/00* (2013.01); *H04L 9/0643* (2013.01); *H04L 9/50* (2022.05); *H04L 2209/84* (2013.01)

(58) Field of Classification Search
    CPC ....... G06Q 40/04; H04L 63/00; H04L 9/3239; H04L 9/0643; H04L 2209/84; H04L 2209/38; G06N 5/025
    See application file for complete search history.

(56) References Cited

U.S. PATENT DOCUMENTS

| | | | | |
|---|---|---|---|---|
| 10,140,470 | B2* | 11/2018 | Kurian | H04L 9/3236 |
| 2003/0208386 | A1* | 11/2003 | Brondrup | G07C 9/00904 |
| | | | | 705/5 |
| 2006/0080156 | A1* | 4/2006 | Baughn | G06Q 10/0639 |
| | | | | 705/7.14 |
| 2007/0276743 | A1* | 11/2007 | Zalta | G06Q 40/123 |
| | | | | 705/34 |
| 2012/0092191 | A1* | 4/2012 | Stefik | G08G 1/148 |
| | | | | 340/932.2 |
| 2013/0059603 | A1* | 3/2013 | Guenec | G07C 9/00904 |
| | | | | 455/456.2 |
| 2014/0330720 | A1* | 11/2014 | Tomlin | G06Q 20/322 |
| | | | | 705/44 |
| 2015/0057783 | A1* | 2/2015 | Rossi | G06Q 10/06 |
| | | | | 700/108 |
| 2017/0206604 | A1* | 7/2017 | Al-Masoud | G06Q 40/08 |
| 2018/0137465 | A1* | 5/2018 | Batra | G06Q 10/103 |
| 2018/0191714 | A1* | 7/2018 | Jentzsch | H04L 63/126 |
| 2018/0218343 | A1* | 8/2018 | Kolb | G06Q 20/405 |
| 2018/0218456 | A1* | 8/2018 | Kolb | G06Q 30/08 |
| 2018/0247258 | A1* | 8/2018 | Kolb | G06Q 10/10 |
| 2018/0365764 | A1* | 12/2018 | Nelson | G06Q 20/065 |
| 2019/0012660 | A1* | 1/2019 | Masters | G06Q 20/381 |
| 2019/0025856 | A1* | 1/2019 | Turato | B60W 10/10 |
| 2019/0043048 | A1* | 2/2019 | Wright | G06Q 20/405 |
| 2019/0268284 | A1* | 8/2019 | Karame | H04L 9/3236 |
| 2019/0304038 | A1* | 10/2019 | Purushothaman | G06Q 50/163 |
| 2019/0311447 | A1* | 10/2019 | Strnad, II | G06Q 40/025 |
| 2019/0340269 | A1* | 11/2019 | Biernat | G05B 19/41865 |
| 2019/0355076 | A1* | 11/2019 | Marcinkowski | G06Q 40/02 |
| 2021/0166312 | A1* | 6/2021 | Dakshi | G06Q 40/04 |

FOREIGN PATENT DOCUMENTS

| | | | | |
|---|---|---|---|---|
| CN | 107993359 A | | 5/2018 | |
| WO | WO-2017145007 A1 | * | 8/2017 | ......... G06Q 20/0658 |
| WO | WO-2017187399 A1 | * | 11/2017 | ........... H04L 9/3066 |

OTHER PUBLICATIONS

Andreas Bogner, et al., "A Decentralised Sharing App Running a Smart Contract on the Ethereum Blockchain", The Internet of Things, ACM, Nov. 7, 2016, pp. 177-178, DOI: 10.1145/2991561. 2998465, ISBN: 978-1-4503-4814-0, 2 pages. (Year: 2016).*

Peyrott—An Introduction to Ethereum and Smart Contracts: a Programmable Blockchain—Captured on the wayback machine on Sep. 7, 2017 (Year: 2017).*

Office Action issued in corresponding Chinese patent application, dated Jul. 16, 2021 (7 pages).

* cited by examiner

MAINTENANCE PLANT MANAGEMENT METHOD, SYSTEM AND DATA MANAGEMENT SERVER

TECHNICAL FIELD

The present application pertains to the technical field of communication, and particularly to a maintenance plant management method, a maintenance plant management system and a data management server.

BACKGROUND

With the progress of the society, there are more and more vehicles, such that the development of vehicle maintenance and repair service industry is further promoted.

Currently, an investor establishes a vehicle maintenance plant, and then hires working staffs including a maintenance technician, and an operation and maintenance team to implement management in fixed working time in the maintenance plant, and provides service for customers. However, at present, a sharing of earnings in the management of the maintenance plant is not open to the public, which makes the enthusiasm of the investors to be not high; moreover, a management of charging is also not open to the public, so that customers are suspicious of whether the maintenance cost is reasonable, and is willing to choose a branded maintenance plant (such as a 4S automobile store) to get vehicle maintenance service; as a consequence, consumers need to queue up due to insufficient resources of maintenance plants of certain brands, while some maintenance plants have low resource utilization rates, so that the requirements of consumers can't be met.

Technical Problems

In view of this, embodiments of the present application provide a maintenance plant management method, a maintenance plant management system and a data management server, which can encourage investors to make investments and meet the requirements of customers by improving the transparency of management of the maintenance plants.

Technical Solutions

In a first aspect, the present application provides a maintenance plant management method comprising: receiving a transaction request of using the maintenance plant from a first user and calling a usage smart contract to grant a permission of usage of the maintenance plant to the first user via a data management server according to the transaction request; wherein the usage smart contract comprises a usage agreement and a transaction sharing rule of the maintenance plant; calling, via the data management server, the usage smart contract to send a transaction payment request to the first user according to transaction information when the first user finishes using the maintenance plant; performing a sharing according to the transaction sharing rule via the data management server when the first user finishes using the maintenance plant; and receiving the transaction information submitted by the data management server and registering the transaction information in a block chain via the block chain node device.

The second aspect of the present application provides a maintenance plant management method, the management method is applied in the data management server and comprises: receiving a transaction request of using maintenance plant from a first user, and calling a usage smart contract to grant a permission of usage of the maintenance plant to the first user according to the transaction request; wherein the usage smart contract comprises a usage agreement and a transaction sharing rule of the maintenance plant; calling the usage smart contract to send a transaction payment request to the first user according to transaction information when the first user finishes using the maintenance plant; performing a sharing according to the transaction sharing rule when the payment transaction is finished by the first user; and sending the transaction information to a block chain node device, so that the block chain node device registers the transaction information in a block chain.

Based on the second aspect, in a first possible implementation mode, before receiving the transaction request of using the maintenance plant from the first user, the method further comprises:
receiving a usage agreement of the maintenance plant submitted by a second user, and sending the usage agreement to the block chain node device, so that the block chain node device generates the usage smart contract according to the usage agreement and registers the usage smart contract in the block chain.

Based on the first implementation mode of the second aspect, in a second possible implementation mode, before receiving the usage agreement of the maintenance plant submitted by the second user, the method further comprises: receiving investment cost information submitted by the second user; obtaining maintenance equipment information and site information that match with the investment cost information from the block chain node device according to the investment cost information; generating an investment scheme of the maintenance plant according to the maintenance equipment information and the site information that match with the investment cost information; and sending the investment scheme of the maintenance plant to the second user.

Based on the second possible implementation mode of the second aspect, in a third possible implementation mode, before receiving the transaction request of using the maintenance plant from the first user, the method further comprises: receiving maintenance plant information and investment cost information of the maintenance plant submitted by the second user, storing the maintenance plant information and the investment cost information in association, generating digital asset information and sending the digital asset information to the block chain node device, so that the block chain node device registers the digital asset information in the block chain.

Based on the second aspect, or based on the first possible implementation mode, the second possible implementation mode or the third possible implementation mode of the second aspect, in a fourth possible implementation mode, after sending the transaction information to the block chain node device, the method further comprises: calculating return on investment according to the transaction information and the investment cost information, and sending return on investment to the block chain node device.

Based on the fourth implementation mode of the second aspect, in a fifth possible implementation mode, the method further comprises: receiving a financing agreement submitted by the second user, and sending the financing agreement to the block chain node device, so that the block chain node device generates a financing smart contract according to the financing agreement; wherein the financing smart contract comprises a financing rule and a financing income sharing rule; receiving financing amount information submitted by a third user; and calling the financing smart contract to calculate return on investment of the third user according to the financing amount information, and sending return on investment to the third user.

A third aspect of the present application provides a maintenance plant management system which comprises a data management server and a block chain node device, the data management server is configured to: receive a transaction request of using the maintenance plant from a first user, and call a usage smart contract to grant a permission of usage of the maintenance plant to the first user according to the transaction request; wherein the usage smart contract comprises a usage agreement and a transaction sharing rule of the maintenance plant; call the usage smart contract to send a transaction payment request to the first user according to transaction information when the first user finishes using the maintenance plant; and perform a sharing according to the transaction sharing rule when the payment transaction is finished by the first user; the block chain node device is configured to receive the transaction information submitted by the data management server and register the transaction information in a block chain.

A fourth aspect of the present application provides a data management server comprising a memory, a processor and computer program stored in the memory and executable by the processor, when executing the computer program, the processor is configured to: receive a transaction request of using the maintenance plant from a first user and call a usage smart contract to grant a permission of usage of the maintenance plant to the first user according to the transaction request; wherein the usage smart contract comprises a usage agreement and a transaction sharing rule of the maintenance plant; call the usage smart contract to send a transaction payment request to the first user according to transaction information when the first user finishes using the maintenance plant; perform a sharing according to the transaction sharing rule when the payment transaction is finished by the first user; and send the transaction information to the block chain node device, so that the block chain node device registers the transaction information in a block chain.

Based on the fourth aspect, in a first possible implementation mode, when executing the computer program, the processor is further configured to:

receive a usage agreement of the maintenance plant submitted by a second user and sending the usage agreement of the maintenance plant to the block chain node device before the transaction request of using the maintenance plant is received from the first user, so that the block chain node device generates a usage smart contract according to the usage agreement and registers the usage smart contract in the block chain.

Based on the first implementation mode of the fourth aspect, in a second possible implementation mode, when executing the computer program, the processor is further configured to: receive investment cost information submitted by the second user before the usage agreement of the maintenance plant submitted by the second user being received; obtain maintenance equipment information and site information that match with the investment cost information from the block chain node device according to the investment cost information; generate a maintenance plant investment scheme according to the maintenance equipment information and the site information that match with the investment cost information; and send the investment scheme of the maintenance plant to the second user.

Based on the second implementation mode of the fourth aspect, in a third possible implementation mode, when executing the computer program, the processor is further configured to: receive maintenance plant information and investment cost information of the maintenance plant submitted by the second user before the transaction request of using the maintenance plant is received from the first user, store the maintenance plant information and the investment cost information in association, generate digital asset information and send the digital asset information to the block chain node device, so that the block chain node device registers the digital asset information in the block chain.

Based on the fourth aspect, or based on the first implementation mode, the second implementation mode or the third implementation mode of the fourth aspect, in a fourth possible implementation mode, when executing the computer program, the processor is further configured to: calculate return on investment according to the transaction information and the investment cost information after the transaction information is sent to the block chain node device, and send return on investment to the block chain node device.

Based on the fourth implementation mode of the fourth aspect, in a fifth possible implementation mode, when executing the computer program, the processor is further configured to: receive a financing agreement submitted by the second user, and send the financing agreement to the block chain node device, so that the block chain node device generates a financing smart contract according to the financing agreement; wherein the financing smart contract comprises a financing rule and a financing income sharing rule; receive financing amount information submitted by a third user; and call the financing smart contract to calculate return on investment of the third user according to the financing amount information and send return on investment to the third user.

Beneficial Effects

The embodiments of the present application provide a maintenance plant management method, the transaction request of using the maintenance plant from the first user is received through the data management server, and the usage smart contract is called to grant the permission of usage of the maintenance plant to the first user according to the transaction request; wherein the usage smart contract comprises the usage agreement and the transaction sharing rule of the maintenance plant; the permission of usage can be granted to the first user, so that maintenance plant can be shared. When the first user finishes using the maintenance plant, the data management server calls the usage smart contract to send the transaction payment request to the first user according to the transaction information, the transaction process is the transaction performed by calling the usage smart contract, the usage smart contract is authenticated by the block chain, such that the charging of the maintenance plant is transparent, the trust degree of the transaction between the customer and the maintenance plant is improved, and the requirements of consumers are met. When the first user finishes the payment transaction, the data management server performs the sharing according to the transaction sharing rule in the usage smart contract, such that the sharing process of the maintenance plant has transparency, investors can be encouraged to make investment, and consumption requirements of the consumers can be met better.

DESCRIPTION OF THE DRAWINGS

In order to describe the technical solution of the present application more clearly, the accompanying figures that need to be used in the descriptions of the embodiments or the related art are introduced briefly below.

PREFERRED EMBODIMENTS OF THE PRESENT APPLICATION

In the following descriptions, in order to illustrate but not to limit the present application, specific details such as a specific system structure, techniques or the like are proposed, thereby facilitating a thorough understanding of embodiments of the present application. In other cases, detailed descriptions of well-known systems and devices, circuits and methods are omitted, thereby preventing unnecessary details from obstructing the description of the present application.

In order to illustrate the technical solution in the present application, the present application is described with reference to particular embodiments below:

Embodiment I

Figure 1:
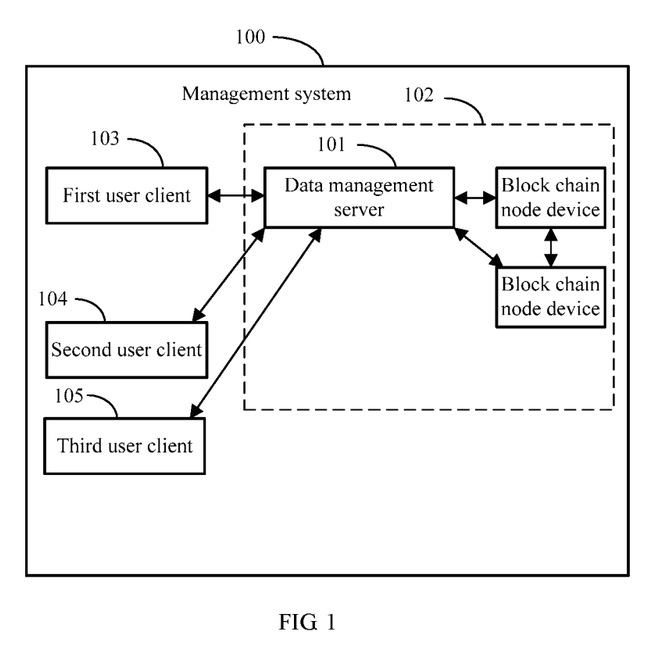
FIG. 1 illustrates a schematic view of a system architecture of a maintenance plant management system provided by embodiment one of the present application.

Embodiment I of the present application provides a maintenance plant management method which is applied to a maintenance plant management system. FIG. 1 illustrates a schematic view of system architecture of the maintenance plant management system, said management system 100 at least comprises a data management server 101, a block chain 102 which contains a plurality of block chain node devices serving as block chain nodes, a first user client 103 and a second user client 104; the aforesaid data management server 101 can have a communication connection with each of the nodes in the block chain 102, the aforesaid data management server 101 can have a communication connection with the first user client 103, the second user client 104, and the third user client 105, respectively. The communication connection can be a wireless communication connection or be a wired communication, it is not limited herein.

In one embodiment, the data management server 101 may be a server that possesses a data management service platform, the data management service platform can be a software system running on a data management server, the aforesaid data management server includes but is not limited to a desktop computer, a tablet computer, a cloud server, a mobile phone terminal, and the like. The server can serve as a single server that accesses the block chain by communicating with the block chain node device, and can also be a node device registered in the block chain.

In order to facilitate a better understanding of the embodiments of the present application, taking a particular application scenario as an example in the following, the aforesaid data management server 101 can be the data management server of the vehicle maintenance plant, the aforesaid first user client 103 can be a client that performs transaction with a maintenance plant such as a terminal device of a vehicle maintenance technician (or may also be a terminal device of a vehicle owner), the aforesaid second user client 104 can be a terminal device of an investor, and the aforesaid third user client 105 can be a terminal device of a financier. In the present application, an investor of a maintenance plant has the property ownership of the maintenance plant. An operation and maintenance team responsible for handling affairs of the maintenance plant such as detecting maintenance equipment, and an operator of the data management service platform are also needed to keep the maintenance service of the maintenance plant available continuously. Meanwhile, all transaction data are counted and analyzed by the data management server, and an investment decision reference is provided for investors. The operator of the data management service platform also plays an important role in the process of keeping the maintenance service available continuously. Therefore, the investors need to achieve a cooperation intention with the operation and maintenance team and the operator of the data management service platform in advance, and establish a maintenance plant capable of providing maintenance service based on the maintenance plant. Meanwhile, the investors form a usage agreement of a maintenance plant based on the cooperation intention. The investors can send the usage agreement of the maintenance plant to any block chain node device through the second user client, and the block chain node which receives the usage agreement generates a usage smart contract according to the usage agreement and registers the usage smart contract in the block chain to be broadcasted in a whole network. When the vehicle maintenance technician is entrusted by the customer to use the maintenance equipment in the maintenance plant to repair the vehicle, he/she can make a reservation with a maintenance plant through the first user client firstly, after the reservation is successful, the vehicle maintenance technician enters the vehicle maintenance plant in a reserved time, and sends a transaction request of using the maintenance plant to the data management server, the data management server detects a permission of usage in the first user account according to the transaction request such as detecting whether a registration has been submitted, and whether a deposit is paid. If the permission of usage is met, the usage smart contract is called to grant the permission of usage of the maintenance plant to the first user client. When the vehicle maintenance technician finishes using the maintenance plant, an end use instruction is sent by the first user client, the data management server calls the usage smart contract to send a transaction payment request to the first user client according to the transaction information; when the vehicle maintenance technician completes payment transaction through the first user client, the data management server performing sharing according to the transaction sharing rule; the block chain node device receives the transaction information submitted by the data management server and registers the transaction information in the block chain.

Figure 2:
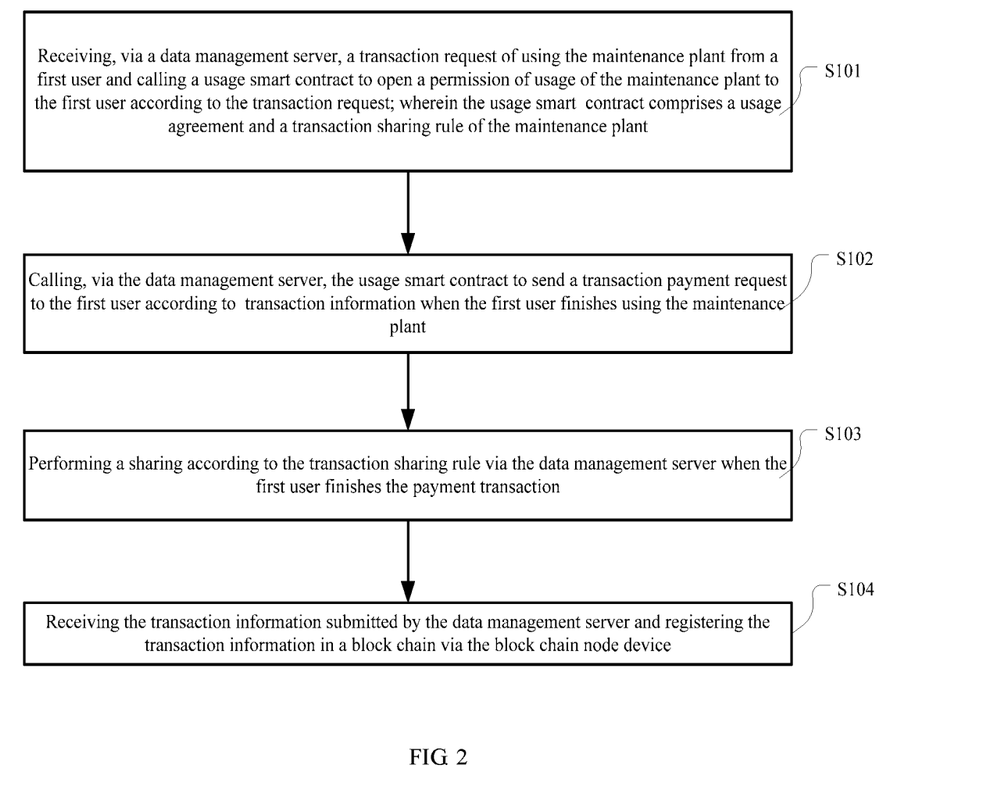
FIG. 2 illustrates a schematic flow diagram of a maintenance plant management method provided by embodiment I of the present application.

As shown in FIG. 2, this embodiment provides a maintenance plant management method which comprises:

step 101, receiving a transaction request of using the maintenance plant from a first user and calling a usage smart contract to grant a permission of usage of the maintenance plant to the first user according to the transaction request via a data management server; wherein the usage smart contract comprises a usage agreement and a transaction sharing rule of the maintenance plant.

In the embodiment of the present application, the first user can be a user that transacts with the maintenance plant, when the first user requests to make a transaction, the usage smart contract is called, and whether the user who requests to make the transaction meets the usage agreement specified in the smart contract is judged. If the usage agreement is met, the permission of usage of the maintenance plant is granted to the first user. The permission of usage of the maintenance plant can be indicating the maintenance plant to be in a state that the first user can enter, or sending the password for unlocking the maintenance plant to the first user client.

In one embodiment, the usage smart contracts is the one based on the block chain technology, can be driven by an event, and includes a computer program capable of running a reproducible shared block chain data book. That is, the usage smart contract is an embedded programming contract, and can generate transactions by performing corresponding actions of executing the usage smart contract (e.g., the maintenance plant starts to be used by the user) under the condition that the usage smart contract (e.g., the condition that the usage smart contract is triggered to be executed can be receiving a code scanning operation of the user) is triggered to be executed according to a plurality of pre-defined rules (e.g., the maintenance plant is started for the user to use).

In a specific application scene, said transaction requested by the first user can be a scanning instruction of the client or other triggering instruction that performs the transaction request. When the maintenance plant is a vehicle maintenance plant, the first user can be a vehicle maintenance technician, the vehicle maintenance technician requests the transaction from the data management server through the client; the data management server judges whether the usage agreement is met, and execute the next step according to the usage agreement of the usage smart contract. Of course, the first user may also be other person, such as a vehicle owner, and the like, it is not limited herein.

Step 102, calling the usage smart contract to send a transaction payment request to the first user according to the transaction information via the data management server when the first user finishes using the maintenance plant.

In the embodiment of the present application, when the first user finishes using the maintenance plant, the data management server calculates the charging amount according to the charging rule in the usage smart contract and the usage information of the first user such as service time and equipment type, and the like, and sends a payment request containing the charging amount to the first user to be confirmed. After receiving the payment request, the first user conducts a corresponding operation such as confirming the payment, thereby completing the transaction.

Step 103, performing a sharing according to the transaction sharing rule via the data management server when the first user finishes the payment transaction.

In one embodiment, when a payment transaction is completed by a first user, the data management server performs the sharing according to the transaction sharing rule in the usage smart contract. For example, the transaction sharing rule which is pre-prescribed determines the proportion of income from transaction, since the investor of the maintenance plant has the property ownership of the maintenance plant, and also needs the operation and maintenance team responsible for handling affairs of the maintenance plant such as detecting maintenance equipment, and the operator of the data management service platform, assuming that the preset income proportion is that: the investor of the maintenance plant has the income proportion of 80%, the operator of the data management service platform has the income proportion of 10%, and the operation and maintenance team of the maintenance plant has the income proportion of 10%, in the actual application, the income proportion can be determined by a joint negotiation of participators including the investor of the maintenance plant, the operation and maintenance team, and the operator of the data management service platform.

In one embodiment, performing the sharing according to the transaction sharing rule can be sharing the income generated in a real-time transaction, and call the usage smart contract from the block chain to calculate income share information and share the income generated in a real-time transaction. Or as an alternative, performing the sharing according to the transaction sharing rule can be calling the usage smart contract from the block chain to calculate the income share information and performing the sharing based on the income of the transaction information stored in the block chain node device within a preset time such as within a certain period.

Step 104, receiving the transaction information submitted by the data management server and registers the transaction information in the block chain via the block chain node device.

In the embodiment of the present application, the block chain is a distributed network system, and has the characteristic that enables each node to efficiently achieve a consensus on the effectiveness of the block data in a decentralization system having a highly distributed decision weight, that is, a common mechanism characteristic of the block chain. Therefore, when the block chain node device receives the transaction information submitted by the data management server, the transaction information can be registered and broadcasted to other block chain node device, can be stored, and has a tamper-resistant characteristic.

In view of this, in the embodiment of the application, the transaction request of using the maintenance plant from the first user is received through the data management server, and the usage smart contract is called to grant the permission of usage of the maintenance plant to the first user according to the transaction request; wherein the usage smart contract comprises the usage agreement and the transaction sharing rule of the maintenance plant; the permission of usage can be granted to the first user, so that maintenance plant can be shared. When the first user finishes using the maintenance plant, the data management server calls the usage smart contract to send the transaction payment request to the first user according to the transaction information, the transaction process is the transaction performed by calling the usage smart contract, the usage smart contract is authenticated by the block chain, such that the charging of the maintenance plant is transparent, the trust degree of the transaction between the customer and the maintenance plant is improved, and the requirements of consumers are met. When the first user finishes the payment transaction, the data management server performs the sharing according to the transaction sharing rule in the usage smart contract, such that the sharing process of the maintenance plant has transparency, investors can be encouraged to make investment, and consumption requirements of the consumers can be met better.

Embodiment II

Figure 3:
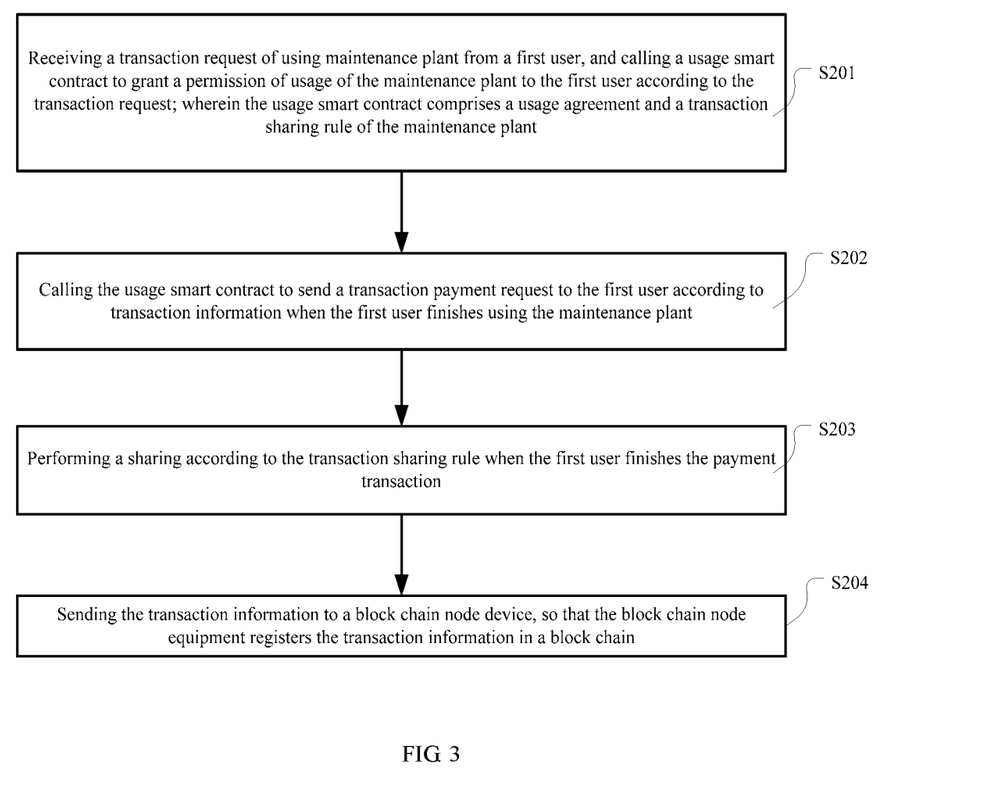
FIG. 3 illustrates a schematic flow diagram of a maintenance plant management method provided by embodiment II of the present application.

A maintenance plant management method provided by a second embodiment of the present application is described below, the management method described in this embodiment is applied to a data management server, as shown in FIG. 3, regarding the part of the embodiment that is the same or similar to the aforesaid embodiment I, reference can be made to the relevant descriptions in embodiment I, it is not repeatedly described herein. The management method in this embodiment comprises:

Step 201, receiving a transaction request of using a maintenance plant from a first user, and calling a usage smart contract to grant a permission of usage of the maintenance plant to the first user; wherein the usage smart contract comprises a usage agreement and a transaction sharing rule of the maintenance plant.

Step 202, calling the usage smart contract according to the transaction information to send a transaction payment request to the first user when the first user finishes using the maintenance plant.

Step 203, performing the sharing according to the transaction sharing rule when the first user finishes payment transaction.

Step 204, sending the transaction information to a block chain node device, such that the block chain node device registers the transaction information in a block chain.

In the embodiment of the present application, regarding the parts of steps 201-204 which are the same or similar to that of steps 101-104 respectively, reference can be made to the relevant descriptions in steps 101-104, it is not repeated described herein.

In view of this, in the embodiment of the application, the transaction request of using the maintenance plant from the first user is received through the data management server, and the usage smart contract is called to grant the permission of usage of the maintenance plant to the first user according to the transaction request; wherein the usage smart contract comprises the usage agreement and the transaction sharing rule of the maintenance plant; the permission of usage can be granted to the first user, so that maintenance plant can be shared. When the first user finishes using the maintenance plant, the data management server calls the usage smart contract to send the transaction payment request to the first user according to the transaction information, the transaction process is the transaction performed by calling the usage smart contract, the usage smart contract is authenticated by the block chain, such that the charging of the maintenance plant is transparent, the trust degree of the transaction between the customer and the maintenance plant is improved, and the requirements of consumers are met. When the first user finishes the payment transaction, the data management server performs the sharing according to the transaction sharing rule in the usage smart contract, such that the sharing process of the maintenance plant has transparency, investors can be encouraged to make investment, and consumption requirements of the consumers can be met better.

Embodiment III

Figure 4:
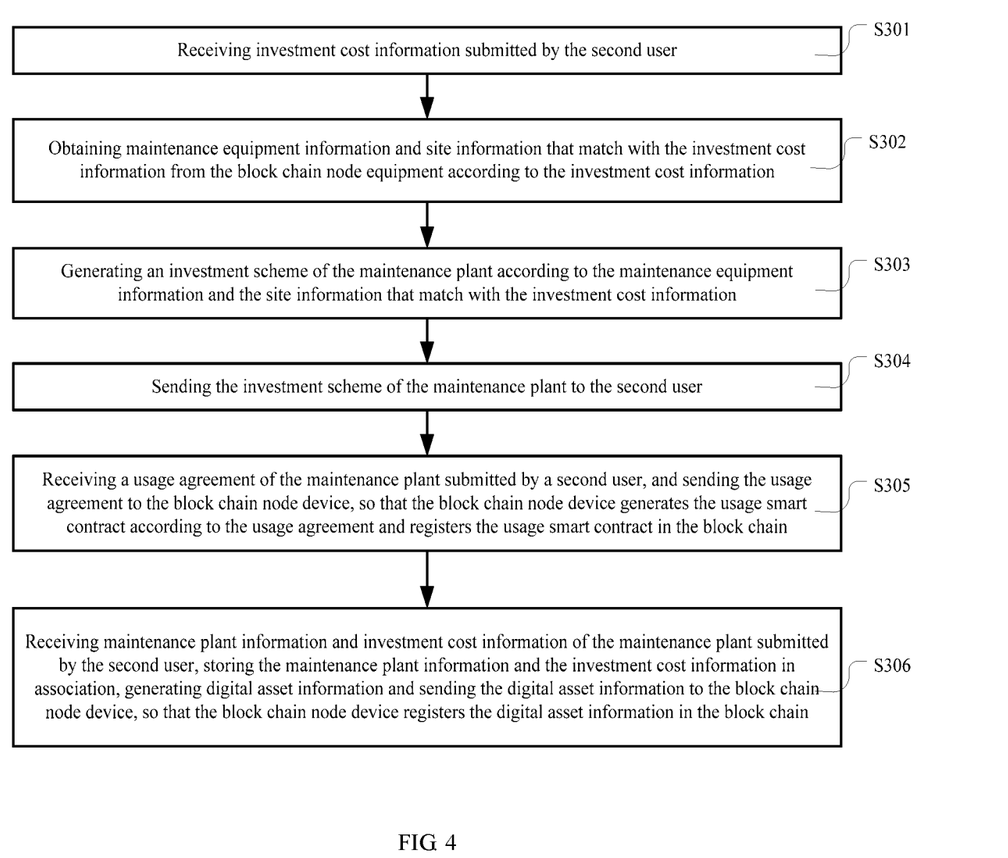
FIG. 4 illustrates a schematic flow diagram of a maintenance plant management method provided by embodiment III of the present application.

A maintenance plant management method provided by embodiment III of the present application is described below, the embodiment III is implemented on the basis of embodiment II, regarding the part of embodiment III that is the same as or similar to embodiment II, reference can be made to the relevant descriptions in embodiment II, and it is not repeatedly described herein. As shown in FIG. 4, in this embodiment, before step 201, the method further comprises:

Step 301, receiving investment cost information submitted by a second user.

In the embodiment of the present application, the second user can be an investor, for example, the investor can log in his account through a second user client and submit the investment cost information. The aforesaid investment cost information can include an investment amount, an investment type, and the like.

Step 302, obtaining maintenance equipment information and site information that match with the investment cost information from the block chain node device according to the investment cost information.

In this embodiment of the present application, when the second user needs to obtain the maintenance equipment information and the site information for establishing the maintenance plant, maintenance equipment information which has been stored and authenticated and the site information of the maintenance plant can be obtained from the block chain node device. The maintenance equipment information includes but is not limited to the maintenance equipment type and the acquisition price of the maintenance equipment; the site information includes but is not limited to a size and a location of the site. Wherein, the acquisition price of the maintenance equipment can include a purchase price or a rental price of the maintenance equipment. The acquisition price of the site may include a rental price or a purchase price of the site. Since the block chain is decentralized, and can implement a point-to-point transaction, coordination and cooperation based on a decentralization credit in a distributed system in which nodes need not to be mutually trusted by applying approaches such as data encryption, time stamps, distributed consensus, economic excitation and so on, problems including a high cost, a low efficiency, and unsafe data storage which widely exist in the centralization mechanism can be solved. Thus, the maintenance equipment information and the site information which are obtained from block chain node device are high in reliability and are convenient to be obtained.

In one embodiment, obtaining the maintenance equipment information and the site information that match with the investment cost information from the block chain node device can be implemented by using the data management server to match up and obtain the maintenance equipment information and the site information matched with the investment cost information in a database of the block chain according to the investment cost information input by the second user. For example, in one application scenario, when the price input by the investor is 2 million RMB and the investment type is a maintenance plant, the maintenance equipment information (e.g., the maintenance equipment information can be a lifting machine, a tire disassembling machine, a balance machine, a four-wheel orientation device, a maintenance device such as a cleaning device, the number of the maintenance equipment and the acquisition price of the equipment and the like, the acquisition price can be the purchase price or the rental price) and the site information (such as the position, the size and acquisition price of the site) matched with 2 million RMB can be obtained from the block chain.

Step 303, generating an investment scheme of the maintenance plant according to the maintenance equipment information and the site information matched with the investment cost information.

In the embodiment of the present application, the investment scheme of the maintenance equipment is generated according to the maintenance equipment information and the site information matched with the investment cost information, the investment scheme can be generated automatically according to a pre-defined investment scheme mode, for example, an investment scheme can be generated by combining the equipment information and the site information matched with the investment information with other relevant information such as the operation and maintenance team and the operator of the data management service platform, and is provided to the second user for reference. The second user can use the maintenance equipment information and the venue information in the investment scheme, and establishes shared maintenance plant with networking by combining an operation and maintenance team and an operator of the data management service platform. The second user can establish shared maintenance plant with networking according to the maintenance equipment information and the site information in the investment scheme and by combining the operation and maintenance team and the operator of the data management service platform. Of course, the second user can make an adjustment investment and establish the maintenance plant on the basis of the investment scheme.

Step 304, sending the investment scheme of the maintenance plant to the second user.

In this embodiment of the present application, the investment scheme of the maintenance plant is sent to the second user client, or sent to the mobile terminal pre-registered by the second user in the form of information, thereby providing reference for the second user.

Step 305, receiving a usage agreement of the maintenance plant submitted by the second user, sending the usage agreement to the block chain node device, so that the block chain node device generates the usage smart contract according to the usage agreement and registers the usage smart contract in the block chain.

In this embodiment of the present application, the aforesaid usage agreement can be a template agreement provided by the data management server, and is submitted after being confirmed by the second user and the operation and maintenance team of the maintenance plant, and can also be uploaded after the second user makes an agreement with the operation and maintenance team and the operator of the data management service platform. The usage agreement includes but is not limited to the usage agreement of the maintenance plant (such as how long the maintenance plant has been used and how much money should the user pay when the user uses different types of maintenance equipment for different time, support of the mode of payment), income sharing rule of the maintenance plant (e.g., sharing the income generated by transaction according to a certain proportion, and the share proportion of income of the investor of the maintenance plant, the share proportion of the operation and maintenance team, the share proportion of the operator of the data management service platform, and the like). The usage agreement is sent to the block chain node device, and the usage smart contract can be generated according to the usage agreement through block chain technology; and the usage smart contract is sent to the block chain node device to be stored, authenticated and broadcasted in a whole network, the usage smart contract is a contract preset and executable by a computing device by applying technical means such as data encryption and time stamps, and so on.

In one embodiment, the usage smart contract can be established through the reserved programmable interface according to the usage agreement, and the usage smart contract based on the block chain is an smart contract that is embedded with a relevant rule (the usage agreement of the maintenance plant, the charging rule and the transaction sharing rule) of the shared maintenance plant, and the smart contract is deployed on the block chain, and can share the income generated by making transaction with the maintenance plant according to the usage smart contract; moreover, since the block chain technology has the characteristics of decentralized storage and authentication, which differs from the condition that the execution of the contract is guaranteed by a central entity in traditional transaction, so that justice and equity of the contract can be guaranteed to a great extent.

Step 306, receiving the maintenance plant information and the investment cost information of the maintenance plant submitted by the second user, storing the maintenance plant information and the investment cost information in association, generating digital asset information and sending the digital asset information to the block chain node device, such that the block chain node device registers the digital asset information in a block chain.

In this embodiment of the present application, the second user can be an investor or other users, the maintenance plant information can include but is not limited to the maintenance equipment information and the site information. The investment cost information can include the investment amount, the investment type and the like. The maintenance plant information and the investment cost information of the maintenance plant submitted by the second user are received. The data management server can generate the digital asset information with reference to the investment cost information and the maintenance plant information. The digital asset information is presented in the form of electronic data, and can reflect the property ownership and the right of use of tangible asset.

In one embodiment, the method further comprises steps 201-204 shown in the embodiment shown in FIG. 3 after step 306, regarding the details, reference can be made to relevant descriptions in steps 201-204, it is not repeatedly described herein.

In view of this, in this embodiment of the present application, sending the digital asset information to the block chain node device can be implemented by generating a unique identification along with the digital assets through the block chain technology, and then deploying the unique identification on the block chain node device. In this way, the digital assets based on the block chains can be authenticated, and because that the block chain has the characteristics of tracing and tamper resistance, the reliability can be improved by uploading the digital asset information to the block chain.

Embodiment IV

Figure 5:
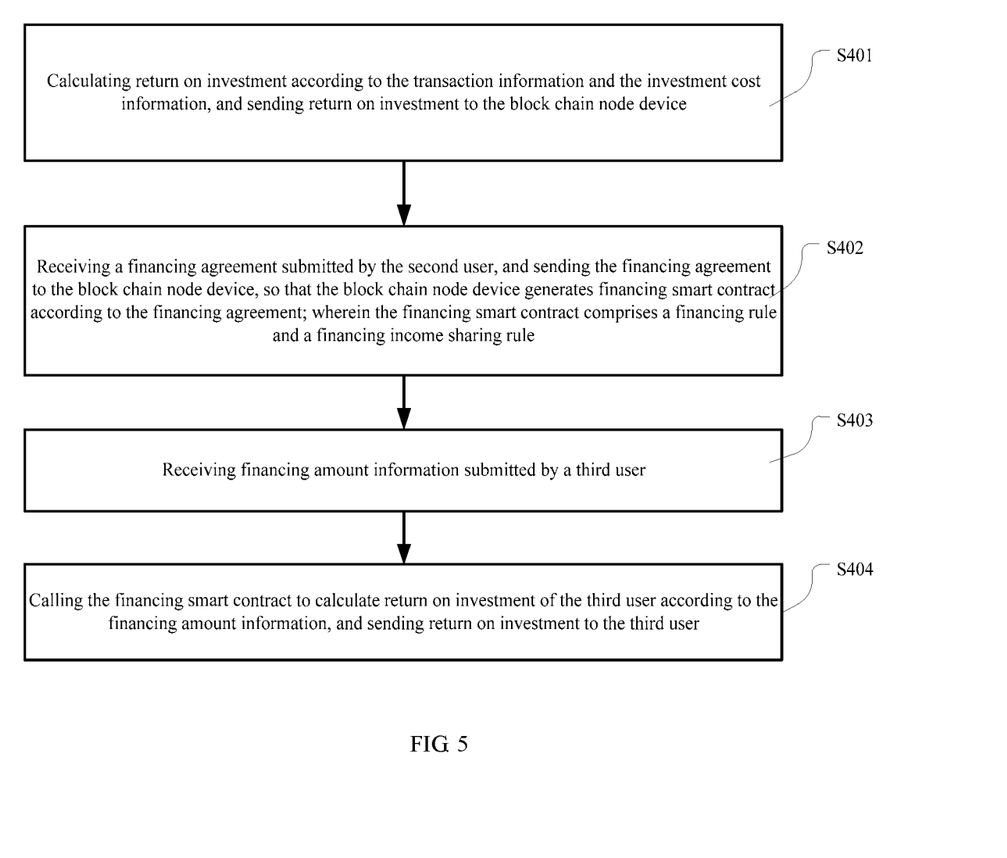
FIG. 5 illustrates a schematic flow diagram of a maintenance plant management method provided by embodiment IV of the present application.

A maintenance plant management method provided by embodiment IV of the present application is described below, embodiment IV of the present application is implemented based on embodiment II or embodiment III, regarding the part that is the same or similar to embodiment II or embodiment III, reference can be made to the relevant descriptions in embodiment II or embodiment III, it is not repeatedly described herein. As shown in FIG. 5, in this embodiment, after step S204, the maintenance plant management method further comprises:

step 401, calculating a return on investment according to the transaction information and the investment cost information, and sending return on investment to the block chain node device.

In the embodiment of the present application, the investment cost information can be calculated according to real-time transaction information and the investment cost information acquired from the block chain node device. Alternatively, return on investment can also be calculated according to the transaction information and the investment cost information acquired from the block chain node device within a certain period.

Step 402, receiving a financing agreement submitted by a second user, sending the financing agreement to the block chain node device, so that the block chain node device can generate a financing smart contract according to the financing agreement; wherein the financing smart contract comprises a financing rule and a financing income sharing rule.

In the embodiment of the present application, when the second user needs to broaden the business of the maintenance plant, more funds need to be invested, the financing agreement can be established by the second user. Of course, the aforesaid financing agreement can be an agreement established by the second user and other users related to the maintenance plant (e.g., an operation and maintenance team, an operator of a data management server). The financing agreement includes the financing rule and the financing income sharing rule. The financing agreement is sent to the block chain node device, when the financing agreement is received, the block chain node device can generate the financing smart contract through block chain technology, according to the financing rule, and using technical means such as data encryption, time stamps, etc., and associate the financing smart contract of the maintenance plant with the corresponding return on investment which is updated in real-time, such that the financier can obtain the financing smart contract based on any node of the block chain network, and then take return on investment of the previous maintenance plant as reference.

Step 403, receiving financing amount information submitted by a third user.

In the embodiment of the present application, the third user can be a financier, and the third user can obtain the financing smart contract and return on investment corresponding to the maintenance plant from the block chain node device. When the third user submits the financing amount information, the financing amount information submitted by the third user is received by the data management server.

Step 404, calling the financing smart contract according to the financing amount information, calculating return on investment of the third user and sending return on investment to the third user.

In the embodiment of the present application, when receiving the financing amount information submitted by the third user, the data management server can calculate return on investment corresponding to the financing amount information according to the ratio of the investment cost information of the maintenance equipment to return on investment, and the financing smart contract called from the block chain node device, and send return on investment to the third user client, or send return on investment in the form of information to a mobile terminal pre-registered by the third user, thereby providing reference for the third user, which can encourage the third user to carry out financing.

In view of this, in the embodiment of the application, the transaction request of using the maintenance plant from the first user is received through the data management server, and the usage smart contract is called to grant the permission of usage of the maintenance plant to the first user according to the transaction request; wherein the usage smart contract comprises the usage agreement and the transaction sharing rule of the maintenance plant; the permission of usage can be granted to the first user, so that maintenance plant can be shared. When the first user finishes using the maintenance plant, the data management server calls the usage smart contract to send the transaction payment request to the first user according to the transaction information, the transaction process is the transaction performed by calling the usage smart contract, the usage smart contract is authenticated by the block chain, so that the charging of the maintenance plant is transparent, the trust degree of the transaction between the customer and the maintenance plant is improved, and the requirements of consumers are met. When the first user finishes the payment transaction, the data management server performs the sharing according to the transaction sharing rule in the usage smart contract, such that the sharing process of the maintenance plant has transparency, investors are encouraged to make investments, and consumption requirements of the consumers can be met better.

Embodiment V

Figure 6:
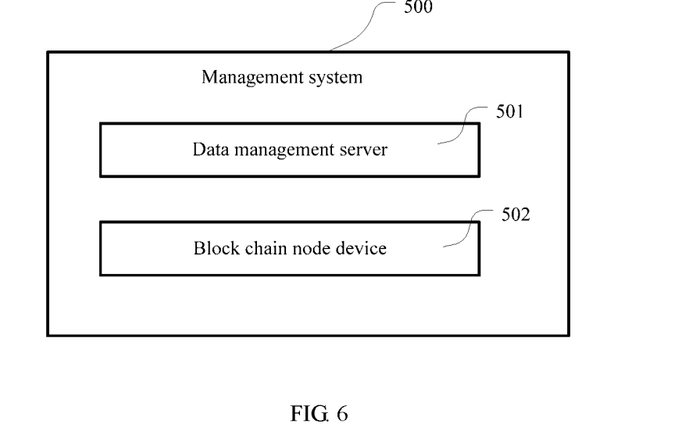
FIG. 6 illustrates a schematic flow diagram of a maintenance plant management system provided by embodiment V of the present application.

Embodiment V of the present application provides a structural schematic view of a maintenance plant management system, as shown in FIG. 6, the management system 500 comprises a data management server 501 and a block chain node device 502;

the data management server 501 is configured to receive a transaction request of using the maintenance plant from a first user, and call a usage smart contract to grant a permission of usage of the maintenance plant to a first user according to the transaction request; wherein the smart contract comprises a usage agreement and a transaction sharing rule of the maintenance plant; when the first user finishes using the maintenance plant, call the usage smart contract to send the transaction payment request to the first user according to the transaction information, and perform a sharing according to the transaction sharing rule when the first user finishes the payment transaction;

The block chain node device 502 is configured to receive the transaction information submitted by the data management server 501 and register the transaction information in a block chain.

In view of this, in the embodiment of the application, the transaction request of using the maintenance plant from the first user is received through the data management server, and the usage smart contract is called to grant the permission of usage of the maintenance plant to the first user according to the transaction request; wherein the usage smart contract comprises the usage agreement and the transaction sharing rule of the maintenance plant; the permission of usage can be granted to the first user, so that maintenance plant can be shared. When the first user finishes using the maintenance plant, the data management server calls the usage smart contract to send the transaction payment request to the first user according to the transaction information, the transaction process is the transaction performed by calling the usage smart contract, the usage smart contract is authenticated by the block chain, so that the charging of the maintenance plant is transparent, the trust degree of the transaction between the customer and the maintenance plant is improved, and the requirements of consumers are met. When the first user finishes the payment transaction, the data management server performs the sharing according to the transaction sharing rule in the usage smart contract, such that the sharing process of the maintenance plant has transparency, investors are encouraged to make investments, and consumption requirements of the consumers can be met better.

Embodiment VI

Figure 7:
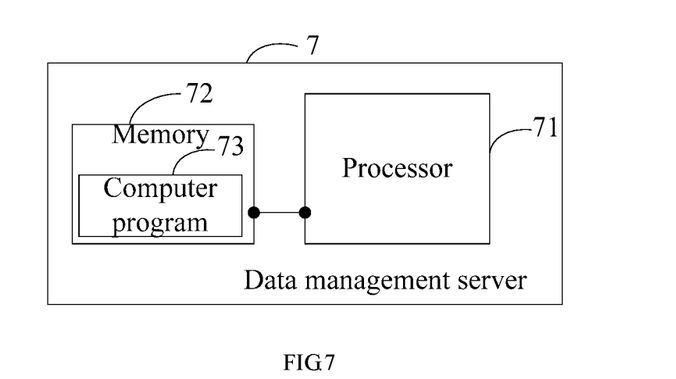
FIG. 7 illustrates a schematic view of a data management server provided by embodiment VI of the present application.

Embodiment VI of the present application provides a schematic view of a data management server, as shown in FIG. 7, the data management server 7 in this embodiment comprises: a processor 71, a memory 72 and computer program 73 stored in the memory 72 and executable by the processor 71. When the computer program 73 is executed by the processor 71, the processor 71 is configured to:

receive a transaction request of using the maintenance plant from a first user, and call a usage smart contract to grant a permission of usage of the maintenance plant to the first user according to the transaction request; wherein the smart contract comprises a usage agreement and a transaction sharing rule of the maintenance plant; call the usage smart contract to send a transaction payment request to the first user according to the transaction information when the first user finishes using the maintenance plant; performs a sharing according to the transaction sharing rule when the first user finishes payment transaction; and send the transaction information to the block chain node device, such that the block chain node device can register the transaction information in a block chain.

In one embodiment, when executing the computer program 73, the processor 71 is further configured to: receive a maintenance plant usage agreement submitted by a second user before receiving the transaction request of using the maintenance plant from the first user, send the usage agreement to the block chain node device, so that the block chain node device can generate the usage smart contract according to the usage agreement and registers the usage smart contract in the block chain.

In one embodiment, when executing the computer program 73, the processor 71 is further configured to: receive investment cost information submitted by the second user before receiving the maintenance plant usage agreement submitted by the second user; acquire maintenance equipment information and site information matched with the investment cost information from the block chain node device according to the investment cost information; generate a maintenance plant investment scheme according to the maintenance equipment information and the site information matched with the investment cost information; and send the maintenance plant investment scheme to the second user.

In one embodiment, when executing the computer program 73, the processor 71 is further configured to: receive the maintenance plant information and the investment cost information of the maintenance plant submitted by the second user before receiving the transaction request of using the maintenance plant from the first user, and store the maintenance plant information and the investment cost information in association, generate digital asset information and send the digital asset information to the block chain node device, such that the block chain node device can register the digital asset information in a block chain.

In one embodiment, when executing the computer program 73, the processor 71 is further configured to: calculate return on investment according to the transaction information and the investment cost information, and send return on investment to the block chain node device after the transaction information being sent to the block chain node device.

In one embodiment, when executing the computer program 73, the processor 71 is further configured to: receive a financing agreement submitted by the second user, send the financing agreement to the block chain node device, so that the block chain node device can generate a financing smart contract according to the financing agreement, wherein the financing smart contract includes a financing rule and a financing income sharing rule; receive financing amount information submitted by a third user; call the financing smart contract according to the financing amount information, calculate an return on investment information of the third user and send return on investment to the third user.

Exemplarily, the aforesaid computer program 73 can be divided into one or a plurality of units/modules, the one or plurality of units/modules can be stored in the memory 72 and is/are executed by the processor 71 thereby implementing the present application.

The data management server 7 can be a computing device such as a cloud server, an intelligent device, a computer, a notebook, and a palm computer, etc. The aforesaid data management server 7 can include but is not limited to: the processor 71, the memory 72. It can be understood for one of ordinary skill in the art that, FIG. 7 is merely an example of the data management server 7, and is not constituted as the limitation to the data management server 7, more or less components shown in FIG. 7 can be included, or some components or different components can be combined; for example, the aforesaid data management server 7 can also include an input and output device, a network access device, a bus, etc.

The so called processor 71 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 72 can be an internal storage unit of the data management server 7, such as a hard disk or a memory of the data management server 7. The memory 72 can also be an external storage device of the data management server 7, such as a plug-in hard disk, a SMC (Smart Media Card), a SD (Secure Digital) card, a FC (Flash Card) equipped on the data management server 10. Further, the memory 72 may include both the internal storage unit and the external storage device of the data management server 7, or either. The memory 72 is configured to store the computer programs, and other procedures and data needed by the data management server 7. The memory 72 can also be configured to store data that has been output or is ready to be output temporarily.

It can be clearly understood by one of ordinary skill in the art that, for describing conveniently and concisely, regarding the detailed working process described above, reference can be made to the corresponding process in the previously described method embodiments, and it is not repeatedly described herein.

In some embodiments provided by the present application, it can be understood that, the system, data management server and method can be implemented according to some other approaches. The units described as separate components can be or not be physically separate, the components shown as units can be or not be physical units. A part or whole of the units could be selected to achieve the objective of the technical solution of this embodiment according to actual need.

If the functionalities are achieved in the form of software functional units, and are sold or used as an independent product, they can be stored in a computer readable storage medium. Based on this understanding, the technical solution of the present application, or the part that is contributable to related art, or a part of the technical solution can be embodied in the form of software product essentially, the computer software product is stored in a storage medium and includes an instruction that enables a computer device (which can be a personal computer, a server, or a network device, and the like) to execute all or part of steps of methods in the various embodiments of the present application. The aforesaid storage medium includes: various mediums capable of storing program codes such as USB flash disk, mobile hard disk, computer storage device, ROM (Read-Only Memory), RAM (Random Access Memory), hard disk, optical disk, and the like.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A maintenance plant management method, wherein the management method comprises:
   receiving, by a data management server from a second user, investment cost information;
   receiving, by the data management server from a first user, a first transaction request comprising first user identification for using a maintenance plant, the data management server being part of a block chain comprising a plurality of block chain node devices;
   calling, by the data management server, a usage smart contract from one of the plurality of block chain node devices by submitting the first user identification to the usage smart contract, the usage smart contract comprising a usage agreement, a charging rule and an income distribution rule of the maintenance plant;
   detecting, by the data management server, a transaction generated by the usage smart contract in response to the smart contract call;
   granting, by the data management server, permission of usage of the maintenance plant to the first user according to the detected transaction and based on the first transaction request meeting the usage agreement of the smart contract;
   receiving, by a data management server from the first user, a second transaction request comprising first user identification and usage information of the first user finishing use of the maintenance plant;
   calling, by the data management server, the usage smart contract from one of the plurality of block chain node devices by submitting the first user identification to the usage smart contract;
   detecting, by the data management server, a transaction generated by the usage smart contract in response to the second smart contract call;
   calculating, by the data management server, based on the charging rule of the smart contract, a payment amount based on the received usage information;
   sending, by the data management server to the first user, a payment request containing the calculated payment amount;
   receiving, by the data management server from the first user, a payment confirmation confirming the calculated payment amount;
   based on the received payment confirmation, performing, by the data management server, a distribution of the calculated payment amount according to the income distribution rule of the maintenance plant within the smart contract
   sending, by the data management server, the transaction information to the block chain node device for registering transaction information in the block chain;
   calculating, by the data management server, a return on investment of the second user according to the transaction information registered in the block chain and the investment cost information; and
   sending, by the data management server, the return on investment of the second user to the block chain node device.

2. The maintenance plant management method according to claim 1, wherein before receiving the first transaction request, the method further comprises:
   receiving, by the data management server, a maintenance plant usage agreement submitted by the second user;
   sending, by the data management server, the maintenance plant usage agreement to the block chain node device, so that the block chain node device generates the usage smart contract according to the usage agreement and registers the usage smart contract in the block chain.

3. The maintenance plant management method according to claim 2, further comprising:
   obtaining, by the data management server, maintenance equipment information that matches with investment cost information from the block chain node device according to the investment cost information;
   generating, by the data management server, an investment scheme of the maintenance plant according to the maintenance equipment information that matches with the investment cost information; and
   sending, by the data management server, the investment scheme of the maintenance plant to the second user.

4. The maintenance plant management method according to claim 3, further comprising:
   receiving, by the data management server, maintenance plant information and the investment cost information of the maintenance plant submitted by the second user;
   storing the maintenance plant information and the investment cost information in association; and
   generating, by the data management server, digital asset information and sending the digital asset information to the block chain node device, so that the block chain node device registers the digital asset information in the block chain.

5. The maintenance plant management method according to claim 1, further comprising:
   receiving, by the data management server, a financing agreement submitted by the second user;
   sending, by the data management server, the financing agreement to the block chain node device, so that the block chain node device generates a financing smart contract according to the financing agreement, wherein the financing smart contract comprises a financing rule and a financing income sharing rule;

receiving, by the data management server, financing amount information submitted by a third user;

calling, by the data management server, the financing smart contract from the block chain node device to calculate a return on investment of the third user according to the financing amount information; and sending, by the data management server, the return on investment of the third user to the third user.

6. A data management server part of a block chain comprising a plurality of block chain node devices, the data management server comprising:

a processor; and a memory comprising a computer program that, when executed by the processor, causes the processor to perform the steps of:

receiving, from a second user, investment cost information;

receiving, from a first user, a first transaction request comprising first user identification for using a maintenance plant;

calling a usage smart contract from one of the plurality of block chain node devices by submitting the first user identification to the usage smart contract, the usage smart contract comprising a usage agreement, a charging rule and an income distribution rule of the maintenance plant;

detecting a transaction generated by the usage smart contract in response to the smart contract call;

granting permission of usage of the maintenance plant to the first user according to the detected transaction and based on the first transaction request meeting the usage agreement of the smart contract;

receiving, from the first user, a second transaction request comprising first user identification and usage information of the first user finishing use of the maintenance plant;

calling the usage smart contract from one of the plurality of block chain node devices by submitting the first user identification to the usage smart contract;

detecting a transaction generated by the usage smart contract in response to the second smart contract call;

calculating based on the charging rule of the smart contract, a payment amount based on the received usage information;

sending, to the first user, a payment request containing the calculated payment amount;

receiving from the first user, a payment confirmation confirming the calculated payment amount;

based on the received payment confirmation, performing a distribution of the calculated payment amount according to the income distribution rule of the maintenance plant within the smart contract;

sending the transaction information to the block chain node device for registering transaction information in the block chain;

calculating a return on investment of the second user according to the transaction information registered in the block chain and the investment cost information; and sending, by the data management server, the return on investment of the second user to the block chain node device.

7. The data management server according to claim 6, wherein the computer program, when executed by the processor further causes the processor to perform the steps of:

receive a usage agreement of the maintenance plant submitted by the second user, and send the usage agreement of the maintenance plant to the block chain node device before the transaction request of using the maintenance plant is received from the first user, so that the block chain node device generates the usage smart contract according to the usage agreement and registers the usage smart contract in the block chain.

8. The data management server according to claim 7, wherein the computer program, when executed by the processor further causes the processor to perform the steps of:

obtain maintenance equipment information that matches with investment cost information from the block chain node device according to the investment cost information;

generate a maintenance plant investment scheme according to the maintenance equipment information that matches with the investment cost information; and send the maintenance plant investment scheme of the maintenance plant to the second user.

9. The data management server according to claim 8, wherein the computer program, when executed by the processor further causes the processor to perform the steps of:

receive maintenance plant information and the investment cost information of the maintenance plant submitted by the second user before the transaction request of using the maintenance plant is received from the first user, store the maintenance plant information and the investment cost information in association, and generate digital asset information and send the digital asset information to the block chain node device, so that the block chain node device registers the digital asset information in the block chain.

10. The data management server according to claim 6, wherein the computer program, when executed by the processor further causes the processor to perform the steps of:

receive a financing agreement submitted by the second user;

send the financing agreement to the block chain node device, so that the block chain node device generates a financing smart contract according to the financing agreement, wherein the financing smart contract comprises a financing rule and a financing income sharing rule;

receive financing amount information submitted by a third user;

call the financing smart contract to calculate a return on investment of the third user according to the financing amount information; and send the return on investment of the third user to the third user.

* * * * *